United States Patent Office 3,657,364
Patented Apr. 18, 1972

3,657,364
PROCESS FOR SEPARATING NITROPARAFFINS
Wheeler C. Crawford and John A. Patterson, Fishkill,
N.Y., assignors to Texaco Inc., New York, N.Y.
No Drawing. Filed Jan. 30, 1970, Ser. No. 7,269
Int. Cl. C07c 79/14
U.S. Cl. 260—644                                  12 Claims

ABSTRACT OF THE DISCLOSURE

This invention relates to a process for selectively separating nitroparaffins from paraffins and from other contaminants of a nitration reaction mixture using a solvent system comprising aprotic solvents and water.

---

This invention relates to a process for separating nitroparaffins from other undesired components of a nitration reaction mixture.

More particularly, this invention concerns a process for selectively separating nitroparaffins from unreacted paraffins and other contaminants present in a nitration mixture.

Nitroparaffins are useful derivatives of saturated (or paraffinic) hydrocarbons. The nitroparaffins are widely used, valuable starting materials for producing derivatives since the nitro group, being highly active, lends itself to further chemical transformations. For example, primary linear nitroalkanes decompose in the presence of bases to form inorganic nitrites, while most nitroalkanes of both the linear and cyclic type can be partially reduced to the ketoximes or aldoximes, or fully reduced to the corresponding amines. Further, many acidic mononitroalkanes condense with aldehydes or ketones to produce nitroalcohols or undergo Michael-type additions with unsaturated compounds to produce useful addition-type products.

The amine and oxime reduction products are useful in the preparation of detergents, while many oximes are useful intermediates in organic synthesis. For example, nitrocyclohexane can be reduced to cyclohexanone oxime which, in turn, can be quantitatively hydrolysed under acidic conditions to produce caprolactam, a known intermediate for forming the polyamide textile referred to as nylon 6.

Nitroparaffins, both of the linear and cyclic types, are ordinarily produced in quantity by the vapor phase, liquid phase or vapor-liquid phase nitration of hydrocarbons at elevated temperatures using the usual nitrating agents such as nitric acid, the oxides of nitrogen such as $NO_2$, $NO$, $N_2O_3$, $N_2O_5$, or mixtures of one or more of these nitrating agents. The preparative processes which are voluminously documented in both the technical and patent literature produce the desired nitroparaffins usually in the form of a crude nitration mixture. The exact composition of the crude nitration mixtures cannot be set forth precisely since they vary according to several factors. These include the choice of nitrating agents and paraffin substrates, the molar ratio of nitrating agents to substrates, and reaction conditions such as temperatures, pressures and exposure times. In most instances, however, the contaminants include a number of oxygenated materials such as ketones, aldehydes, carboxylic acids, polynitroparaffins, etc., and, in most instances, from 75 to 90% or more by weight of unreacted paraffin. The predominance of paraffins in the mixture is a result of the highly exothermic nature of most nitration processes. Unless the rate of nitration is carefully controlled, relatively large quantities of undesired oxygenated by-products are produced. In most instances the literature documents the use of relatively large excesses of paraffin to nitrating agents to serve as a moderator or diluent. The paraffin diluent allows the nitration to be maintained at a reasonable rate without producing excess oxygenated products. For instance, in the nitration of gaseous paraffins where gaseous nitric acid is used as the nitrating agent, molar excesses of paraffin to nitric acid ranging from 10:1 to 15:1 are used, while in the nitration of liquid paraffins using the oxides of nitrogen, or nitric acid as nitrating agents, molar excesses of paraffin to nitrating agent ranging from 2:1 to 20:1 are employed. In view of the likelihood of having large quantities of unreacted paraffin in the nitration mixture, many of the currently used nitration procedures must utilize separation procedures which enable the substantial separation of the mononitroparaffin products from the paraffins.

Several separation procedures are employed. Some separate the paraffins while others retain the paraffins in the nitration mixture and separate the mononitroparaffins from the nitration mixture. For example, one of the most common procedures for separating the nitroparaffin involves the formation of nitronate or acinitroparaffin salts by treating the nitration mixture with alkaline materials such as the oxides and hydroxides of the alkali or alkaline earth metals. The salt-paraffin solution is extracted with pentane, hexane or the like to remove paraffinics while leaving the salts in solution. After the paraffins are removed the salts are treated with acid to produce the desired nitroparaffins. Unfortunately, salt formation is not satisfactory on a large scale because of the risk of oxidizing some of the nitroparaffin products to undesired oxygenates, as well as requiring the use of large quantities of alkaline and acidic materials.

Similarly, the separation of nitroparaffins from paraffins by distillation is not completely satisfactory in that the nitroparaffin products and the paraffins in many instances have boiling points that are very close or overlap. Thus they can only be separated with difficulty, even with the use of costly large scale distillation equipment. In addition, the use of large scale distillation introduces the problem of thermal oxidation which reduces yield.

In view of the shortcomings of the prior art, improved procedures for separating paraffins and nitroparaffins contained in nitration mixtures from each other, are sought. Desirably, the procedure would provide an inexpensive and rapid means of separating product from impurities and starting materials, with a minimal investment in processing equipment. Ideally, the separation procedure would provide the nitroparaffin products in good yield, substantially free from paraffins, would not require the use and disposal of large volumes of caustic acid and salts, and could be carried out by relatively unskilled personnel.

Recently applicants have developed an extraction procedure using aprotic-based solvent systems which appear to obviate the disadvantages of salt formation and distillation procedures. The inventive prrocedure, as far as is known, is novel for the purpose of separating nitroparaffins from paraffins in nitration mixtures.

In practice, a nitration mixture containing substantial quantities of paraffins is contacted at least once with an aprotic solvent-water extractant mixture comprising a major amount of at least one aprotic solvent, a minor amount of water and optionally a minor amount of at least one nitrogenous base, under agitation conditions sufficient to separate said nitration mixture into a paraffin-rich phase and nitroparaffin-rich phase, and then separating the nitroparaffin-rich phase from the paraffin-rich phase.

In the favored practice, a nitration mixture containing from 10 to 30 parts by weight of mononitroparaffins containing from 10 to 15 carbon atoms in the paraffinic moiety, and from 70 to 90 parts by weight of paraffins containing from 10 to 15 carbon atoms is:

(1) Contacted at least once with an aprotic solvent-water-nitrogenous base at from about 10 to 75° C., the weight ratio of aprotic solvent to water being from about 95 to 99:1, the weight ratio of aprotic solvent to nitrogenous base being from about 95 to 99:1, and the weight ratio of aprotic solvent to said nitroparaffin contained in said nitration mixture being from about 5 to 15:1, under agitation conditions sufficient to cause separation of the nitration mixture into a nitroparaffin-rich phase and a paraffin-rich phase, (2) Separating the nitroparaffin-rich phase from the paraffin-rich phase, and (3) Isolating the nitroparaffins contained in the nitroparaffin-rich phase.

In the preferred practice, each part by weight of nitration mixture containing from 10 to 15 parts by weight of mononitroparaffins containing from 10 to 14 carbon atoms in the paraffinic moiety, and from 85 to 90 parts by weight of paraffins containing from 10 to 14 carbon atoms, is:

(1) Contacted at 20–30° C. at least with 1 to 2 parts by weight of a mixture of N,N-dialkylformamide, water and a nitrogenous base, said nitrogenous base being selected from the group consisting of gaseous ammonia, ammonium hydroxide, alkanolamines and mixtures thereof, the weight ratio of the N,N-dialkylformamide to the water and nitrogenous base components ranging from about 90 to 99 parts by weight of N,N-dialkylformamide for each part by weight of water and for each part by weight of nitrogenous base; under agitation conditions sufficient to cause separation of said nitration mixture into a nitroparaffin-rich phase and a paraffin-rich phase, (2) Separating the nitroparaffin-rich phase, and (3) Isolating the nitroparaffins contained in the nitroparaffin-rich phase.

In order to aid in the understanding of the inventive concept the following supplemental disclosure is submitted:

(A) Nitroparaffins.—The nitroparaffins which lend themselves to separation in the inventive process comprise linear and cyclic paraffins containing from 5 to 40 carbon atoms. The most useful class of nitroparaffins are the primary and secondary mononitrated paraffins containing from 10 to 24 carbon atoms. The preferred mononitroparaffins are illustrated by the nitrodecanes, the nitroundecanes, the nitrododecanes and their homologues. The nitroparaffins can be single compounds, or their mixtures, in the form of relatively pure compounds or in the form of their crude nitration mixtures, accompanied by substantial quantities of paraffins and/or oxygenated compounds such as ketones, aldehydes, esters, acids, polynitroparaffins, etc. Particularly useful are the secondary nitrated paraffins and their mixtures containing 10 to 20 carbon atoms, contaminated by 70 to 90 percent by weight of paraffins and/or from about 1 to 10% by weight of one or more of the aforementioned oxygenated impurities. These mixtures are particularly preferred because they are potentially available in large quantities from the vapor-liquid phase nitration of liquid paraffins using gaseous nitric acid and/or nitric oxides as nitrating agents, as described in the technical and patent literature. These are principally mixtures of secondary nitroparaffins with the nitro groups randomly distributed along the paraffinic chain. However, as indicated above, the nitration mixtures from other nitration processes can also be utilized in the inventive process.

(B) Paraffinic contaminant.—The paraffins which are present in large quantities in the nitration mixtures with the desired nitroparaffins and oxygenated impurities, can comprise linear or cyclic paraffins containing from 5 to 40 or more carbon atoms. The paraffins can comprise single compounds or their mixtures in the form of relatively pure compounds or relatively crude mixtures. As set forth supra, mixtures of the normal paraffin containing 10 to 24 carbon atoms are particularly preferred since they are readily available commercially and when used as substrates in many vapor and liquid-phase nitrations of n-paraffins produce the corresponding nitroparaffins in good yield.

(C) Aprotic solvents.—The aprotic solvents which can be used in this invention have the following characteristics when combined with water:

(1) They are dipolar solvents having a dielectric constant, F, in excess of 15 to 25° C. and cannot donate protons for hydrogen bonding to an appreciable extent, and (2) They solubilize mononitroparaffins to the extent that at least 1% by weight solution of the nitroparaffin or mixture of nitroparaffins can be prepared and maintained in solution at 20–30° C. Illustrative aprotic solvents which can be used include alkyl sulfoxides such as dimethyl sulfoxide and diisopropyl sulfoxide, tetramethylene sulfone, alkyl phosphoramides, such as trimethyl and hexamethyl phosphoramide, thioureas such as N,N'-dimethyl thiourea, tetramethyl thiourea and dialkylformamides such as N,N-dimethylformamide and its homologues as well as mixtures of two or more of these aprotic solvents.

The preferred aprotic solvents are the N,N lower dialkylformamides, the lower alkyl sulfoxides and their mixtures. These solvents are preferred since they are especially good solvents for mononitroparaffins containing up to 40 or more carbon atoms, and when combined with critical ratios of water and/or nitrogenous base, having partition coefficients for the nitroparaffins in the order of at least ten times greater than they have for the paraffins.

(D) Nitrogenous bases.—The nitrogenous bases, which, though optional components of the aprotic-based extractant solutions, are preferably included, comprise nitrogen-containing materials giving a basic reaction with water and which are miscible with the aprotic solvents and water in the desired proportions. All of the amines have been found to have pK base strengths in aqueous solution of at least 9.5 at temperatures ranging from 25 to 30° C. Illustrative of these nitrogenous bases which can be used are ammonia, ammonium hydroxide, alkanolamines, such as diethanolamine and triethanolamine, diaminoalkanes, such as 1,2 - diaminopropane and 1,3 - diaminopropane, alkylamines, such as N-butylamine and n-hexylamines, alkylenetriamines and tetraamines, such as triethylenetetramine and the like. The preferred nitrogenous bases are selected from the group consisting of ammonia, ammonium hydroxide, aliphatic amines, hydroxyl amines and their mixtures having the desired miscibility with the aprotic solvents and water.

(E) Reaction conditions.—

(1) Temperature.—The temperature at which the extraction is made is not critical. Ordinarily a temperature ranging from about 10 to 75° C. is satisfactory to effect separation. However, temperatures within somewhat narrower range, about 20° to 30° C. are preferred inasmuch as no extra cooling is required.

(2) Pressure.—Normally atmospheric or near atmospheric pressures are employed since higher and lower pressures require more specialized equipment without offering any apparent advantage.

(3) Process times.—The time required for the separation of the nitration mixture into nitroparaffin-rich and paraffin-rich phases usually is quite brief, i.e., between a few minutes up to about 1 to 3 hours. However, dependent upon the components of the nitration mixture and the nitrating agents employed, emulsions can briefly be formed which would additionally extend process time up to a few hours or more. Longer times are less convenient but do not appear to adversely affect either the extent of separation or the yield of nitroparaffin ultimately obtained.

(4) Weight ratios of extractant to nitroparaffins.—Ordinarily the quantity of aprotic-water based solvent mixture is based upon the nitroparaffin content of the nitration mixture. It has been found that the extractant should be in considerable excess. Weight ratios ranging from about 1.5 to 25 parts by weight of the aprotic solvent-water mixture per part by weight of nitroparaffin can be used to quantitatively remove the desired nitroparaffins, particularly in multiple contact extractions. The use of larger ratios is primarily limited by cost and convenience. The favored weight ratio of extractant to nitroparaffin is somewhat narrower, ranging from about 10 to 20 parts of extractant per part of nitroparaffin per extraction, when from three to five extractions are carried out. The preferred range of aprotic-water based extractant has been found to range from about 12 to 15 parts by weight of extract for each part of nitroparaffin in the nitration mixture. This weight ratio is preferred since it usually results in the removal of about 95 to 98% by weight of recoverable nitroparaffin present in the nitration mixture in three to five extractions.

(5) Preferred aprotic solvent-water extractant mixtures.—The preferred extractant compositions comprise the following three components in the weight ratios shown below:

(a) From about 90 to 98 parts by weight of N,N-dimethylformamide,
(b) From about 1 to 5 parts by weight of water,
(c) From about 1 to 5 parts of ammonium hydroxide (calculated as free ammonia).

While the efficiency of the extractive process is based upon gas chromatographic (g.c.) analysis of the nitration mixture before and after extraction, any reliable analytical method can be employed. The procedure employed a gas chromatographic device of the usual type containing (1) a controlled source of carrier gas; (2) a sample injector system; (3) a chromatographic column; and (4) a detector. A five foot stainless steel column having an outside diameter of one-quarter of an inch equipped with thermal conductivity devices, packed with acid washed [1] diatomaceous earth was used [2]. The samples to be analysed were injected onto the column at 275° C. and were programmed at temperature increments ranging from 4° to 6° C. per minute. The detector temperature was 325° C., the current was 150 milli-amps and the carrier gas was helium, fed into the system at a rate of 50 ml. per minute.

(6) Selection of extraction equipment and what constitutes sufficient agitation.—The novel extraction process can be utilized with either manual or mechanical means of agitation. The main criteria is that the agitation conditions provided are sufficient to assure that there is adequate contact between the extractant and the nitration mixture being extracted, and sufficient time is allowed for resolution of the phases. Inasmuch as the degree of contact and what constitutes sufficient agitation involves complex calculations not fully understood at this time, the terms will be defined empirically. That is, the extraction is conducted under agitation conditions (contact, mixing and settling time) that are sufficient to separate the nitration mixture into two phases which are at equilibrium with each other.

The apparatus employed to achieve the desired separation can range from hand-shaken separatory funnels and simple mechanically agitated vessels to elaborate equipment designed to operate with gravitational force and/or mechanical assistance. The choice is ordinarily dependent upon the convenience of the user and the size of the nitration mixture. On a laboratory size scale, relatively simple extraction equipment, such as hand-actuated separatory funnels, or other relatively simple equipment, are employed. Pilot plant runs or production runs, for practical considerations of time and labor, ordinarily require gravity or power-assisted extractors on a large scale. Examples of gravity-operated extractions include spray columns, baffle columns, packed columns, perforated-plate columns and the like. Examples of powered extractors include mixer columns, mixer-settler units, pulse columns, rotating disk contactors, centrifugal extractors and the like. More extensive descriptions of equipment which can be used appear in the technical literature, such as the Encyclopedia of Chemical Technology (edited by Kirk and Othmer, published by the Interscience Encyclopedia, Inc., N.Y.), volume 6, page 91 et seq. of the 1st edition and the First Supplement Volume, pages 330 et seq.

In order that the inventive concept be presented in the greatest possible detail, the following illustrative examples are submitted:

EXAMPLE 1

Use of an aprotic-water-ammonium hydroxide extraction solution as extractant for nitration mixture (A) A 100 parts by weight portion of a nitration mixture (derived from the vapor-liquid phase nitration of a mixture of $C_{10}$ to $C_{14}$ normal paraffins at 330° F. using gaseous nitrogen dioxide as the nitrating agent) which gas chromatography analysis indicates comprises 15% by weight of a mixture of the corresponding secondary nitroparaffins randomly distributed along the paraffin chain, less than 1% by weight of oxygenated impurities (ketones, alcohols and carboxylic acids) and about 85% by weight of the unreacted n-paraffin mixture, is manually extracted three times in a flask with fresh 100 parts by weight of an extractant solution, containing 95 parts by weight of N,N-dimethylformamide (DMF), 2.5 parts by weight of water and 2.5 parts by weight of ammonium hydroxide (calculated as $NH_3$ gas), using the following procedure.

The extractant solution and nitration mixture are vigorously mixed in the flask for 5 minutes at 22° C. then allowed to settle into two distinct phases. The upper phase is the n-paraffin-rich layer while the lower phase is the nitro-paraffin-rich layer. After two or more contacts, the raffinate layers and extract layers are separately pooled and subjected to gas chromatographic (g.c.) analysis. A comparison of the g.c. analysis of the nitration mixture prior to extraction and of the pooled raffinate layers after the third extraction shows that less than 10% by weight of the nitroparaffins originally present in the nitration mixture remains in the pooled raffinate.

(B) The same results are obtained using the same quantities of the same extractant solution and the same extraction procedure upon a nitration mixture derived from the vapor liquid phase nitration of dodecane in which mixed oxides of nitrogen were used as the nitrating agent. The nitration mixture prior to extraction contained 25% by weight of mono-nitroparaffins and 75% by weight of unreacted paraffins.

(C) Similar separations are carried out at 25° C. on two different nitration mixtures using manually agitated separatory funnels, the DMF based extractant solution, extraction techniques and analysis method used in Example 1(A). The nitration solution in each instance is dederived from the nitration of normal paraffins with mixtures of nitrogen oxides at elevated temperatures. In the first instance a $C_{10}$ to $C_{15}$ normal paraffin mixture is converted to a nitration mixture comprising (by g.c. analysis) 20% by weight of $C_{10}$ to $C_{15}$ mononitroparaffins, less than 1% by weight of oxygenated impurities and about 79% by weight of $C_{10}$ to $C_{15}$ normal paraffins. In the second instance the nitration mixture prior to extraction comprised 5% by weight of a mixture of $C_{15}$ to $C_{20}$ mononitroparaffins, less than 1% by weight oxygenated impurities and 94% by weight of $C_{15}$ to $C_{20}$ paraffins. After three extractions on each nitration mixture gas chromatography indicates that less than 10% of the respective mixture of nitroparaffin product remains in the raffinate.

---

[1] The acid washed diatomaceous earth has dispersed upon it 5% of a commercially available polysilicone.
[2] A more comprehensive description of g.c. methods can be found among other literature sources in volume 5, pages 429–441 of "Encyclopedia of Chemical Technology" (second edition) published by Interscience.

EXAMPLES 2 TO 7

Use of other aprotic-based solvent mixtures as extractants for nitration mixtures In these examples seven separate portions of the nitration mixture of Example 1(A), having the identical analysis, are each separately extracted three times using 100 parts by weight portions of extractant solution, using the identical extraction, pooling and analytical procedures used in 1(A). The sole difference is the substitution of 95 parts by weight of the designated aprotic component (or mixture of components) for the 95 parts by weight portion of N,N-dimethylformamide (DMF). However, all of the extractant solutions contain 2.5 parts by weight of water and 2.5 parts by weight of ammonium hydroxide as did the extractant mixture of Example 1(A). The aprotic components used in each example are shown below:

| Aprotic component(s): | Example number |
|---|---|
| 95 parts by weight of dimethylsulfoxide | 2 |
| 95 parts by weight of diisopropyl sulfoxide | 3 |
| 95 parts by weight of hexamethyl phosphoramide | 4 |
| 95 parts by weight of trimethyl phosphoramide | 5 |
| 47.5 parts by weight of dimethyl sulfoxide and 47.5 parts by weight of N,N-dimethylformamide | 6 |
| 47.5 parts by weight of hexamethyl phosphoramido and 47.5 parts by weight of N,N-dimethylformamide | 7 |

In all instances when the above aprotic component is substituted for DMF, the pooled raffinates contained less than 10% by weight of nitroparaffin.

EXAMPLES 8–15

Use of additional N,N-dimethylformamide based extractant solutions for the separation of nitroparaffin from nitration mixtures In these examples 100 parts by weight portions of nitration mixtures derived as in Example 1(A), which by g.c. analysis, are known to contain 1% by weight of oxygenated impurities, 15% by weight of nitroparaffin and 84% by weight of a $C_{10}$ to $C_{14}$ mixture of n-paraffins are extracted as follows:

Each portion of the nitration mixture is added to a 500 ml. flask containing from 50 to 100 parts by weight of the indicated aprotic based extractant solution, the flasks are stoppered and are mechanically agitated. After about 15 minutes stirring at 25° C. the stirring is stopped and the solutions within the flasks are allowed to settle into two distinct phases, a paraffin-rich and nitroparaffin-rich phase. The extracts and raffinates are collected, analysed and compared to the original assay obtained by g.c. analysis of the untreated nitration mixture. As can be seen from the data presented in Table I, aprotic solvent alone, as illustrated by N,N-dimethylformamide (Example 10) gives relatively poor separation even after three extractions. Similarly, mixtures of DMF and nitrogenous bases free from water (Examples 8, 9 and 11) also give relatively poor results. In contrast, extract solutions containing the component, DMF, water and nitrogenous base (Examples 13, 14 and 15) produce the best separations of nitroparaffin from paraffins and oxygenated impurities, particularly at the 95:4:1 weight ratios.

TABLE I [1].—EXTRACTION OF NITROPARAFFINS FROM A NITRATION MIXTURE

| | Extractant composition | | Extractant dosage | First extraction | | | | | | | |
|---|---|---|---|---|---|---|---|---|---|---|---|
| | | | | Weights | | | G.C. analyses area percent | | | | |
| | | | | | | | Raffinate | | | $RNO_2$ extract | |
| Example Number | Component | Amount of soln. used | | Raffinate | Extract | Liberated $RNO_2$ | DMF | RH | $RNO_2$ | RH | $RNO_2$ |
| 8 | DMF / TEA [2] | 90 / — | 100 | 90.5 | 105.5 | 13.0 | 1.8 | 93.2 | 5.0 | 48.2 | 51.9 |
| 9 | DMF / $NH_4OH$ | 90 / 10 | 100 | 99.5 | 98.0 | 4.5 | 1.9 | 86.3 | 11.8 | 37.7 | 62.3 |
| 10 | DMF | 100 | 95 | 79.5 | 104.8 | 17.0 | 2.1 | 91.5 | 6.4 | 55.0 | 45.0 |
| 11 | DMF / $NH_4OH$ | 99 / 1 | 100 | 89.5 | 108.5 | 14.0 | 0.5 | 91.3 | 8.2 | 46.6 | 53.4 |
| 12 | DMF / $H_2O$ | 95 / 5 | 100 | 100.1 | 101.0 | 7.5 | 1.1 | 89.3 | 9.5 | 41.2 | 58.8 |
| 13 | DMF / $H_2O$ | 95 / 4 | 100 | 96.8 | 101.4 | 7.5 | 2.2 | 88.2 | 9.8 | 39.7 | 60.3 |
| 14 | DMF / $H_2O$ / $NH_4OH$ | 95 / 4 / 1 | 50 | 100.5 | 49.1 | 3.0 | 1.7 | 87.1 | 11.1 | 40.4 | 59.6 |
| 15 | DMF / $H_2O$ / $NH_4OH$ | 95 / 4 / 1 | 150 | 93.1 | 156.0 | 8.2 | 1.3 | 89.7 | 8.9 | 42.6 | 57.4 |

| | Second extraction | | | | | | | |
|---|---|---|---|---|---|---|---|---|
| | Weights | | | G.C. analyses area percent | | | | |
| | | | Liberated $RNO_2$ | Raffinate | | | $RNO_2$ extract | |
| Example Number | Raffinate | Extract | | DMF | RH | $RNO_2$ | RH | $RNO_2$ | Extractant dosage |
| 8 | | | | | | | | | |
| 9 | | | | | | | | | |
| 10 | 76.3 | 53.0 | 6.1 | 0.9 | 93.6 | 5.4 | 57.6 | 42.4 | 50.0 |
| 11 | 75.0 | — | 7.0 | 0.9 | 93.5 | 5.5 | 59.2 | 40.8 | 100.0 |
| 12 | 86.9 | — | 4.6 | 1.5 | 90.6 | 8.1 | 48.6 | 51.4 | 100.0 |
| 13 | 84.4 | 103.6 | 4.9 | 1.5 | 91.3 | 7.2 | 48.2 | 51.8 | 100.0 |
| 14 | 93.6 | 53.8 | 3.6 | 1.5 | 86.8 | 11.6 | 41.1 | 58.8 | 50.0 |
| 15 | 83.2 | 158.0 | 2.4 | 0.5 | 95.3 | 4.7 | 58.7 | 41.3 | 150.0 |

| | Third extraction | | | | | | | Phase composition | | | |
|---|---|---|---|---|---|---|---|---|---|---|---|
| | Weights | | | G.C. analyses area percent | | | | First extraction | | | |
| | | | | Raffinate | | | Extract | Raffinate | | Extract | |
| Example Number | Extractant dosage | Raffinate | Extract | Liberated $RNO_2$ | DMF | RH | $RNO_2$ | RH | $RNO_2$ | RH | $RNO_2$ |
| 8 | | | | | | | | 84.3 | 4.5 | 6.3 | 6.8 |
| 9 | | | | | | | | 85.7 | 11.7 | 1.7 | 2.8 |
| 10 | | | | | | | | 72.8 | 5.1 | 9.3 | 7.6 |
| 11 | | | | | | | | 81.8 | 7.4 | 6.5 | 7.5 |
| 12 | | | | | | | | 90.5 | 9.6 | 3.1 | 4.4 |
| 13 | 100 | 73.9 | 102.8 | 1.0 | 1.0 | 95.6 | 3.3 | 55.0 | 45.0 | 85.4 | 9.5 | 3.0 | 4.5 |
| 14 | 50 | 85.0 | — | 2.2 | 1.3 | 87.8 | 10.9 | 55.7 | 44.2 | 87.7 | 11.1 | 1.2 | 1.8 |
| 15 | 150 | 73.8 | — | 3.7 | 0.4 | 97.8 | 1.8 | 72.5 | 27.4 | 83.6 | 8.3 | 3.5 | 4.7 |

| | Phase composition | | | | | | | | Partition coefficients | | Ratio of partition coefficients, $K_{RNO_2}/K_{RH}$ |
| | Second extraction | | | | Third extraction | | | | | | |
| | Raffinate | | Extract | | Raffinate | | Extract | | | | |
| Example Number | RH | RNO₂ | RN | RNO₂ | RH | RNO₂ | RN | RNO₂ | Alkanes | RNO₂ | |
|---|---|---|---|---|---|---|---|---|---|---|---|
| 8 | | | | | | | | | 0.075 | 1.5 | 20 |
| 9 | | | | | | | | | 0.02 | 0.24 | 12 |
| 10 | 71.3 | 4.1 | 3.5 | 2.6 | | | | | 0.13 | 1.5 | 11.5 |
|    |      |     |     |     |   |   |   |   | 0.05 | 0.71 | 14.2 |
| 11 | 70.0 | 4.1 | 4.1 | 2.9 | | | | | 0.08 | 1.01 | 12.6 |
|    |      |     |     |     |   |   |   |   | 0.059 | 0.71 | 12.0 |
| 12 | 78.8 | 7.1 | 2.2 | 2.4 | | | | | .034 | 0.46 | 13.5 |
|    |      |     |     |     |   |   |   |   | .028 | 0.34 | 12.2 |
| 13 | 76.9 | 6.1 | 2.4 | 2.6 | 70.6 | 2.4 | 0.6 | 0.5 | .035 | 0.47 | 13.4 |
|    |      |     |     |     |      |     |     |     | .031 | 0.43 | 13.9 |
|    |      |     |     |     |      |     |     |     | .0084 | 0.21 | 26.4 |
| 14 | 81.2 | 10.9 | 1.5 | 2.1 | 74.6 | 9.3 | 1.2 | 1.0 | .014 | 0.162 | 11.6 |
|    |      |      |     |     |      |     |     |     | .018 | 0.192 | 10.7 |
|    |      |      |     |     |      |     |     |     | .016 | 0.107 | 9.2 |
| 15 | 79.3 | 3.9 | 1.4 | 1.0 | 72.4 | 1.3 | 2.8 | 1.0 | 0.42 | 0.57 | 1.4 |
|    |      |     |     |     |      |     |     |     | 0.18 | 0.26 | 1.4 |
|    |      |     |     |     |      |     |     |     | 0.39 | 0.78 | 2.0 |

[1] Except where otherwise indicated, all of the values shown represent grams (g.).
[2] Triethanol-amine.

As indicated supra, this invention is advantageous in several respects. For example, it offers a low cost extractant system which economically provides clean, quantitative separations of mononitroparaffins from oxygenated impurities and unreacted paraffins. In addition, the novel extraction process provides clean separations of the desired nitroparaffins without the need for costly and relatively tedious processes requiring salt formation and subsequent acidic hydrolysis. Finally, this invention is advantageous in that reaction conditions are relatively flexible and lend themselves to various modifications and substitutions insofar as the choice of nitration mixtures, aprotic solvents and nitrogenous bases etc., are concerned. These variations in solvents and reaction conditions can be made without changing the inventive concept. The metes and bounds of this invention are best determined by the following claims read in light of the specification.

What is claimed is:

1. An extraction process for separating nitroparaffins from nitration mixtures containing substantial quantities of paraffins and nitroparaffins whose paraffinic moieties contain from 5 to 40 carbon atoms, comprising the steps of:
   (a) contacting said nitration mixtures at temperatures of about 10° to 75° C. at least once with a weight excess of an aprotic-base aqueous extractant solution which comprises a major amount of at least one aprotic solvent selected from the group consisting of dialkylformamides, alkylsulfoxides, alkylphosphoramides, alkylsulfoxides, alkylphosphoramides and mixtures thereof, and a minor amount of water,
   (b) under agitation conditions sufficient to separate said nitration mixture into a nitroparaffin-rich phase and a paraffin-rich phase, and
   (c) separating said nitroparaffin-rich phase from said paraffin-rich phase.

2. The process of claim 1 wherein the aprotic extractant solution contains a minor amount of at least one nitrogeneous base.

3. The process of claim 1 wherein the aprotic solvent comprises a mixture of aprotic solvents.

4. An extraction process for separating mono-nitroparaffin from nitration mixtures containing substantial quantities of mononitroparaffins whose paraffin moiety contains from 10 to 24 carbon atoms, and at least 70 parts by weight of paraffins per hundred parts of said nitration mixture, said paraffins containing from 10 to 24 carbon atoms, comprising the steps of:
   (a) contacting the nitration mixtures at least thre times with from 15 to 25 parts by weight of an aprotic-based aqueous extractant solution per part by weight of nitroparaffin contained in said nitration mixture, said aprotic-based aqueous extractant solution comprising a major amount of at least one aprotic solvent selected from the group consisting of N,N-lower dialkylformamides, lower alkyl sulfoxides and their mixtures, a minor amount of water and a minor amount of at least one nitrogenous base selected from the group consisting of ammonia, ammonium hydroxide, ethanolamine and mixtures thereof,
   (b) under agitation conditions sufficient to effect substantial contact between said aprotic-based aqueous solution, until said nitration mixture separates into mononitroparaffin-rich phase and a paraffin-rich phase,
   (c) separating said mononitroparaffin-rich phase from said paraffin phase, and
   (d) separating the mononitroparaffin contained in said mononitroparaffin phase.

5. The process of claim 4 wherein the extraction is carried out between about 10° C. to about 75° C.

6. An extraction process for separating mononitroparaffins containing from 10 to 24 carbon atoms, from nitration mixtures containing from 10 to 30 parts by weight of said mononitroparaffins and from 90 to 70 parts by weight of paraffins containing from 9 to 16 carbon atoms, comprising the steps of:
   (a) contacting said nitration mixture at least three times at about 20–30° C. with a liquid aprotic-based aqueous extractant solution which comprises:
      (1) from 95 to 99 parts by weight of a liquid aprotic solvent selected from the group consisting of N,N-dimethyl formamide, dimethyl sulfoxide, hexamethylphosphortiamide and mixtures thereof,
      (2) from 1 to 5 parts by weight of water, and
      (3) from 1 to 5 parts by weight of nitrogenous base selected from the group consisting of ammonia, ammonium hydroxide, ethanolamine and mixtures thereof, said aprotic based-aqueous extractant being present in weight ratios ranging from 8 to 25 parts by weight of extractant per part(s) by weight of nitroparaffin content of said nitration mixture,
   (b) under agitation conditions sufficient to effect substantial contact with said nitration mixtures and said extractant until said nitration mixture separates into a mononitroparaffin-rich phase and a paraffin-rich phase,
   (c) separating said mononitroparaffin-rich phase from said paraffin phase, and
   (d) separating the mononitroparaffin contained in said mononitroparaffin-rich phase.

7. The process of claim 6 wherein the nitrogenous base is ammonia.

8. The process of claim 6 wherein the nitrogenous base is diethanolamine.

9. The process of claim 6 wherein the nitrogenous base is selected from the group consisting of ammonia, ammonium hydroxide, aliphatic amines, hydroxyamines and mixtures of said bases, miscible with said liquid-based aprotic-aqueous extractant solution.

10. The process of claim 6 wherein the aprotic solvent contains N,N-dimethylformamide.

11. The process of claim 6 wherein the aprotic solvent is N,N-dimethylformamide and the nitrogenous base is ammonium hydroxide.

12. The process of claim 6 wherein the aprotic solvent is N,N-dimethylformamide and the nitrogeneous base is triethanolamine.

References Cited

UNITED STATES PATENTS

| | | | |
|---|---|---|---|
| 3,272,874 | 9/1966 | Abbott | 260—644 |
| 3,378,596 | 4/1968 | Toops et al. | 260—644 |

OTHER REFERENCES

Shriner et al.: Identification of Organic Compounds, 3rd ed., John Wiley & Sons, Inc., New York, 1948, pp. 280 to 282.

LELAND A. SEBASTIAN, Primary Examiner

U.S. Cl. X.R.

260—705

PO-1050
(5/69)

UNITED STATES PATENT OFFICE
CERTIFICATE OF CORRECTION

Patent No. 3,657,364        Dated April 18, 1972

Inventor(s) WHEELER C. CRAWFORD: JOHN A. PATTERSON

It is certified that error appears in the above-identified patent and that said Letters Patent are hereby corrected as shown below:

Col. 6, lines 61 & 62    "de-derived" should read --derived--

Col. 9, Claim 1, line 52    Delete "alkylsulfoxides, alkylphosphoramides"

Col. 9, Claim 4, line 72    "thre" should read --three--

Signed and sealed this 2nd day of April 1974.

(SEAL)
Attest:

EDWARD M. FLETCHER, JR.
Attesting Officer

C. MARSHALL DANN
Commissioner of Patents